(12) United States Patent
Behara et al.

(10) Patent No.: US 9,377,325 B2
(45) Date of Patent: Jun. 28, 2016

(54) SYSTEM AND METHOD FOR GRAPHICALLY DISPLAYING AIRSPACE SPEED DATA

(71) Applicant: HONEYWELL INTERNATIONAL INC., Morristown, NJ (US)

(72) Inventors: Dilip Kumar Behara, Bangalore (IN); Naveen Venkatesh Prasad Nama, Bangalore (IN); Aaron Gannon, Anthem, AZ (US); Marc L. Lajeunesse, Lafayette, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 311 days.

(21) Appl. No.: 13/846,424

(22) Filed: Mar. 18, 2013

(65) Prior Publication Data
US 2014/0266807 A1 Sep. 18, 2014

(51) Int. Cl.
*G01C 21/00* (2006.01)
*G01C 23/00* (2006.01)
G08G 1/123 (2006.01)
G06F 7/70 (2006.01)
G05D 3/00 (2006.01)

(52) U.S. Cl.
CPC ....................... *G01C 23/00* (2013.01)

(58) Field of Classification Search
CPC ...... G01C 23/005; G01C 23/00; G01C 5/005; G08G 5/0021
USPC ............. 340/969, 971, 977, 988; 701/14, 7, 3
See application file for complete search history.

(56) References Cited

U.S. PATENT DOCUMENTS

| | | | |
|---|---|---|---|
| 6,552,669 B2 | 4/2003 | Simon et al. | |
| 7,389,163 B1 * | 6/2008 | Colich | G08G 5/006 701/121 |
| 7,433,781 B2 | 10/2008 | Bitar et al. | |
| 7,453,375 B2 | 11/2008 | Chamas et al. | |
| 7,747,360 B2 | 6/2010 | Canu-Chiesa et al. | |
| 7,957,853 B2 | 6/2011 | Stock et al. | |
| 8,155,806 B2 | 4/2012 | Suddreth et al. | |
| 8,185,301 B1 | 5/2012 | Simon | |
| 8,285,427 B2 | 10/2012 | Rogers et al. | |
| 2003/0227395 A1 * | 12/2003 | Zeineh | G01C 21/26 340/988 |
| 2007/0001830 A1 * | 1/2007 | Dagci | B60K 31/185 340/438 |

(Continued)

FOREIGN PATENT DOCUMENTS

EP 2302325 A2 3/2011

OTHER PUBLICATIONS

EP Search Report for Application No. 14160164.1 dated Aug. 27, 2014.

(Continued)

*Primary Examiner* — Jack K Wang
(74) *Attorney, Agent, or Firm* — Ingrassia Fisher & Lorenz, P.C.

(57) ABSTRACT

A system and method are provided for graphically displaying airspace data including speed restrictions on an aircraft display. The system comprises an avionics display system coupled to a processor that is configured to retrieve airspace data from a database, display the aircraft data on the display, and display a visual representation of the airspace. Then the processor may alter the format of the visual representation of the airspace to a second visual representation, if the airspace data meets predetermined criteria.

17 Claims, 5 Drawing Sheets

(56) References Cited

U.S. PATENT DOCUMENTS

| | | | |
|---|---|---|---|
| 2010/0017105 A1* | 1/2010 | Pepitone | G08G 5/0008 701/120 |
| 2010/0023187 A1 | 1/2010 | Gannon et al. | |
| 2010/0030401 A1* | 2/2010 | Rogers | G01C 23/00 701/3 |
| 2010/0131126 A1 | 5/2010 | He et al. | |
| 2011/0077804 A1 | 3/2011 | He et al. | |
| 2011/0118908 A1* | 5/2011 | Boorman | G08G 5/0021 701/14 |
| 2011/0248878 A1* | 10/2011 | Sampigethaya | G08G 5/0013 342/36 |
| 2011/0313597 A1* | 12/2011 | Wilson | G01C 23/00 701/3 |

OTHER PUBLICATIONS

EP Examination Report for Application No. 14160164.1 dated Sep. 12, 2014.

Barrows, A. K.: "Flying Curved Approaches and Missed Approaches: 3-D Display Trials Onboard a Light Aircraft" Published in the Proceedings of ION GPS-96, Kansas City, Missouri, USA, Sep. 17-20, 1996.

* cited by examiner

SYSTEM AND METHOD FOR GRAPHICALLY DISPLAYING AIRSPACE SPEED DATA

TECHNICAL FIELD

Embodiments of the subject matter described herein relate generally to avionics display systems. More particularly, embodiments of the subject matter described herein relate to a system and method for graphically displaying airspace-based speed data alerting symbology on a cockpit display.

BACKGROUND

Airspace that is navigable by aircraft is divided into different types (e.g., classes and/or categories) of three-dimensional sections. Most nations typify airspace sections consistent with those delineated by the International Civil Aviation Organization (ICAO). Some nations, including the United States, include additional airspace types, generally referred to as Special Use Airspace, for which additional rules and restrictions may apply.

In the United States, there are two general categories of airspace, regulatory and non-regulatory. The regulatory airspace is divided into eight different airspace types, referred to as Class A, B, C, D, E, and G airspace areas, restricted airspace areas, and prohibited airspace areas. The non-regulatory airspace are divided into four different airspace types, which are referred to as military operations areas (MOAs), warning areas, alert areas, and controlled firing areas. The regulatory and non-regulatory airspace categories may additionally include airspace subcategories. These airspace subcategories are referred to as controlled airspace, uncontrolled airspace, special use airspace, and other airspace.

The categories and subcategories assigned to particular airspaces are dictated by several factors (e.g. density of aircraft movements, the nature of the operations, and national or public interest), and each airspace has its own set of associated regulations. For example, Class B airspace is a controlled airspace which generally extends from the surface of the earth to ten thousand feet from mean sea level surrounding the nation's busiest airports in terms of airport operations or passenger enplanements. Aircraft that enter Class B airspace must be given clearance by air traffic control and must abide by speed, separation, and other regulations.

Airspace violations have occurred due to the unavailability of alerting information to pilots regarding the various classes of airspace and the restrictions associated therewith. Current display systems do graphically represent altitude information associated with a particular class of airspace; however, they do not display the associated speed limitations since pilots may be overwhelmed due to the abundance of displaced information.

To assist pilots in identifying airspaces and their associated restrictions, many aircraft are equipped with an avionics display system that graphically render a moving map, which includes a depiction of the airspaces around the aircraft. Data about each airspace (e.g. class, altitude range, etc.) may be displayed as text overlaid onto the moving map. However, such systems do not display speed restrictions associated with a type of class of airspace.

In view of the forgoing, it would be desirable to provide a navigation display system to graphically display the airspaces and their associated speed data in a readily comprehensible manner. This would reduce a pilot's workload during flight and provide for better position and situational awareness.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for graphically displaying airspace on an aircraft display. The method comprises retrieving airspace data from a database and altering the format of the visual representation of the airspace to a second visual representation, if the airspace data meets predetermined criteria.

Also provided is a system for graphically displaying airspaces on a display is provided. The system comprises an avionics display system coupled to a processor that is configured to (1) retrieve airspace data from a database; and (2) alter the format of the visual representation of the airspace to a second visual representation, if the airspace data meets predetermined criteria.

Furthermore, a method is provided for graphically displaying airspace on an aircraft cockpit display. The method comprises retrieving aircraft data from a database, displaying the aircraft data on the display, and displaying a visual representation of the airspace. Then altering the visual representation, if the aircraft exceeds a permitted maximum speed in the airspace.

DETAILED DESCRIPTION

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how an airspace overlay may be utilized to graphically display airspace data in a readily comprehendible manner. It should be appreciated that this explicated example embodiment is merely an example and a guide for implementing the novel display system and method for graphically displaying airspace based speed alerts. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
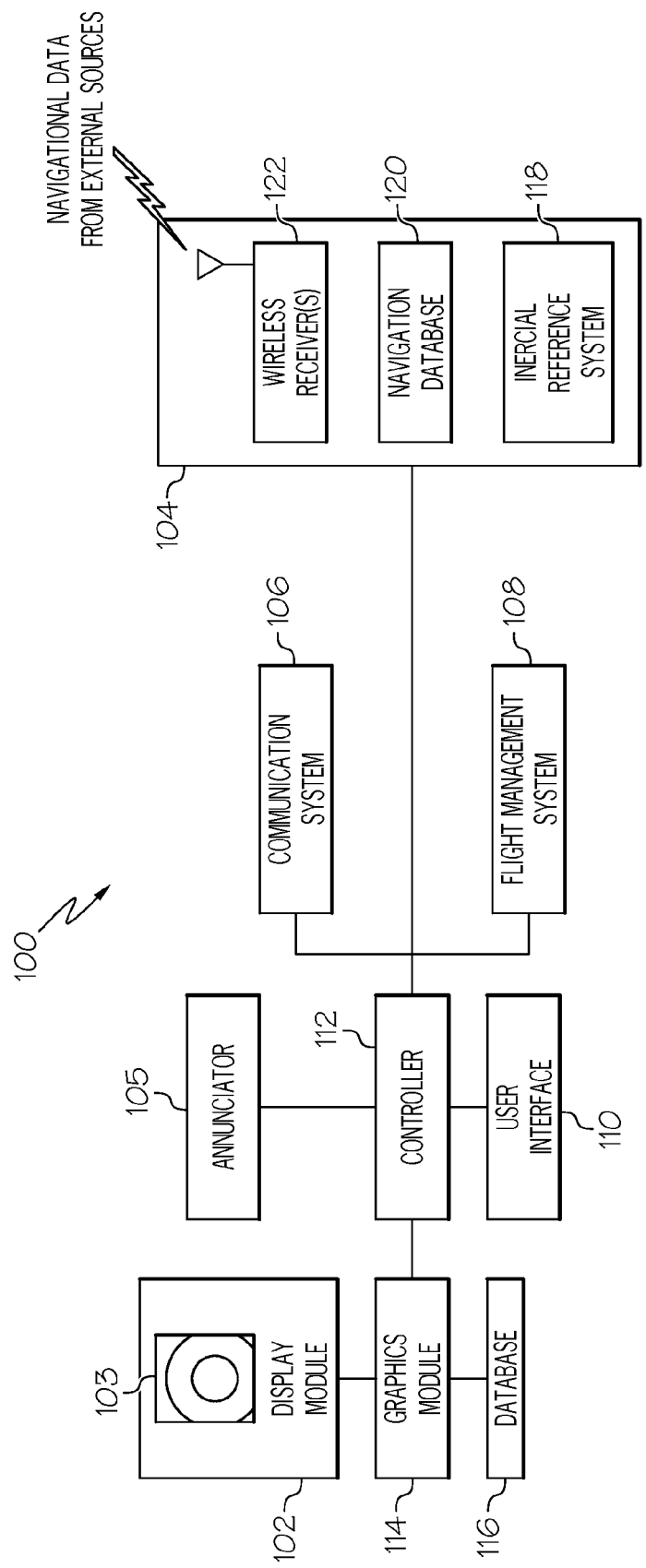
FIG. 1 is a block diagram of an information display system suitable for use in an aircraft in accordance with an embodiment.

FIG. 1 depicts an exemplary embodiment of an aircraft display system 100. In an exemplary embodiment, the display system 100 includes, without limitation, a display device 102 for displaying a graphical flight plan image 103, a navigation system 104, a communications system 106, a flight management system (FMS) 108, a controller 112, a graphics module 114, a user interface 110, and a database 116 suitably configured to support operation of the graphics module 114 and display device 102, as described in greater detail below. Navigation system 104 may include an inertial reference system 118, a navigation database 120 and one or more wireless receivers 122 for receiving navigational data from external sources in a well-known manner.

It should be understood that FIG. 1 is a simplified representation of a display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the controller 112 for obtaining and/or providing real-time flight-related information that may be displayed on the display device 102.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey graphical representations or images of VRPs on the display device 102. As stated previously, navigational system 104 includes an inertial reference system 118, a navigation database 120, and at least one wireless receiver 122. Inertial reference system 118 and wireless receiver 122 provide controller 112 with navigational information derived from sources onboard and external to the host aircraft, respectively. More specifically, inertial reference system 118 provides controller 112 with information describing various flight parameters of the host aircraft (e.g., position, orientation, velocity, etc.) as monitored by a number of motion sensors (e.g., accelerometers, gyroscopes, etc.) deployed onboard the aircraft.

By comparison, and as indicated in FIG. 1, wireless receiver 122 receives navigational information from various sources external to the aircraft. These sources may include various types of navigational aids (e.g., global position systems, non-directional radio beacons, very high frequency omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

In an exemplary embodiment, the navigation database 120 includes various types of navigation-related data stored therein. In a preferred embodiment, navigation database 120 is an onboard database that is carried by the aircraft. The navigation-related data includes various flight plan related data such as, for example, and without limitation: locational data for geographical waypoints; distances between waypoints; track between waypoints; data related to different airports; navigational aids; obstructions; special use airspace; political boundaries; communication frequencies; and aircraft approach information. In an embodiment, the navigation database 120 stores airspace data, which includes the geographical location, size, altitude, surrounding terrain of each class of airspace and their associated speed restrictions.

Controller 112 is coupled to the navigation system 104 for obtaining real-time navigational data and/or information regarding operation of the aircraft to support operation of the display system 100. In an exemplary embodiment, the communications system 106 is coupled to the controller 112 and configured to support communications to and/or from the aircraft, as is appreciated in the art. The controller 112 is also coupled to the flight management system 108, which in turn, may also be coupled to the navigation system 104 and the communications system 106 for providing real-time data and/or information regarding operation of the aircraft to the controller 112 to support operation of the aircraft. In an exemplary embodiment, the user interface 110 is coupled to the controller 112, and the user interface 110 and the controller 112 are cooperatively configured to allow a user to interact with display device 102 and other elements of display system 100, as described in greater detail below.

The display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to select content displayed on the display device 102, as described in greater detail below. In various embodiments, the user interface 110 may be realized as a keypad, touchpad, keyboard, mouse, touch screen, joystick, knob, microphone, or another suitable device adapted to receive input from a user. In preferred embodiments, user interface 110 may be a touch screen, cursor control device, joystick, or the like.

The navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

The communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The controller 112 and/or graphics module 114 are configured in an exemplary embodiment to display and/or render information pertaining to airspaces on the display device 102 to allow a user (e.g., via user interface 110) to review various aspects (e.g., speed of the aircraft, estimated flight time, rates of ascent/descent, flight levels and/or altitudes, and the like) of the flight plan. The controller 112 generally represents the hardware, software, and/or firmware components configured to facilitate the display and/or rendering of a navigational map on the display device 102 and perform additional tasks and/or functions described in greater detail below. Depending on the embodiment, the controller 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The controller 112 may also be implemented as a combination of computing devices, e.g., a combination of a digital signal processor and a microprocessor, a plurality of microprocessors, one or more microprocessors in conjunction with a digital signal processor core, or any other such configuration. In practice, the controller 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the controller 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
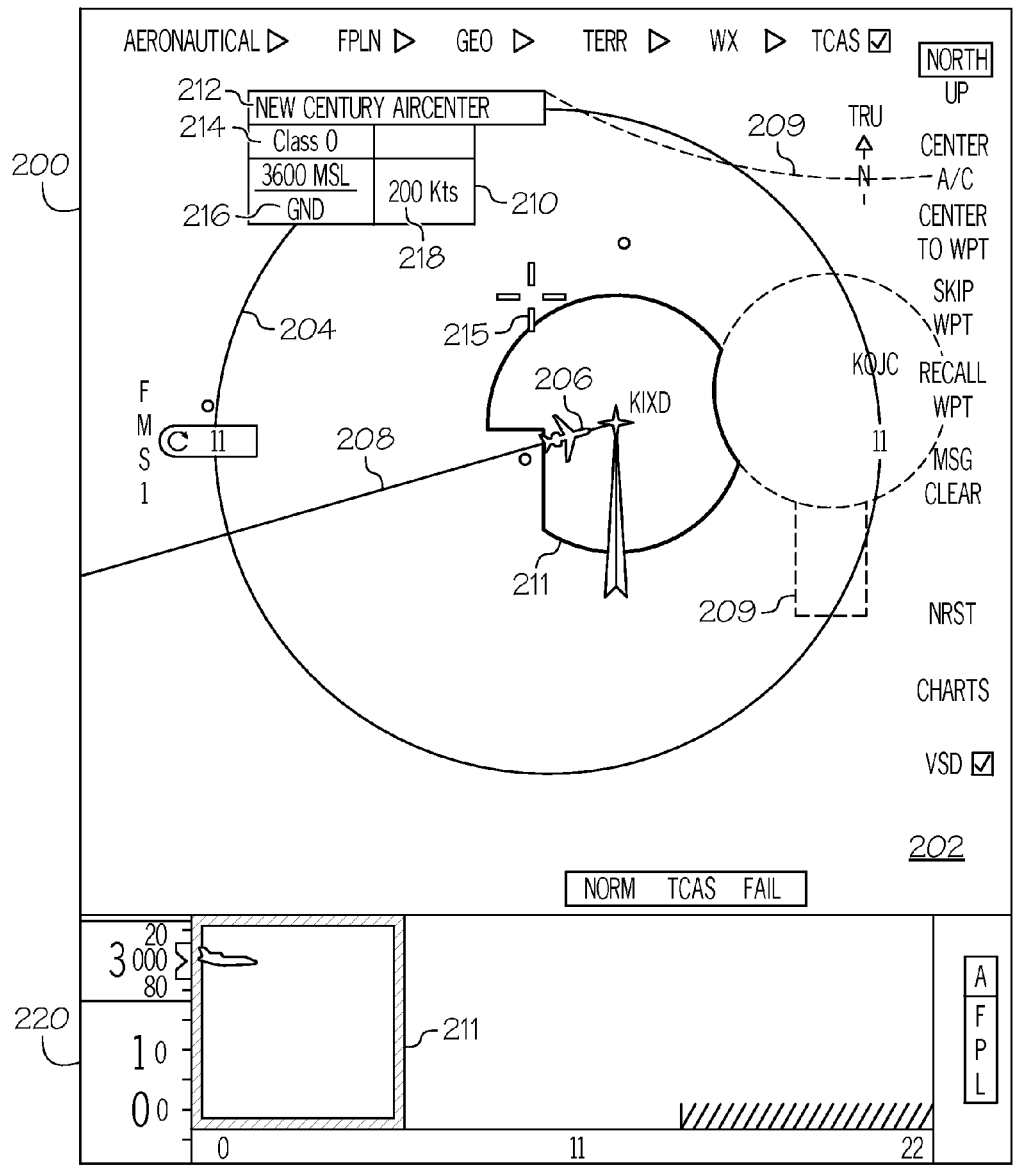
FIG. 2 and FIG. 3 are exemplary illustrations of graphical displays comprising a navigational map and an airspace overlay.

FIG. 2 is an exemplary illustration of a graphical display comprising a navigational map 200 and an airspace overlay 202. The controller 112, database 116, and graphics module 114 (FIG. 1) may be configured to render navigational map 200 to display terrain, topology or other suitable items or points of interest within a given distance of the aircraft. The pilot may set the threshold distance of the viewable area by zooming in to display a smaller geographic area or zooming out to display a larger geographic area. The relative scale of the area is shown by a range ring 204 having a number "11" thereon indicating the range is eleven nautical miles. A graphical representation of a host aircraft 206 including the direction 208 of its flight may also be rendered. Controller 112 may be programmed to automatically generate overlay 202 below a predefined altitude, or the pilot may manually enable the generation of airspace overlay 202. Airspace overlay 202 displays symbology that represents all airspaces within the viewable area of the navigational map 200. Each airspace is delineated by a graphical perimeter 209 (i.e. solid line, dashed line, colored line, highlighted line, etc.) surrounding the airspace.

A pilot may position a cursor 215 in the vicinity of an airspace of interest (in the case of a cursor controlled interface) or tap the airspace of interest (in the case of a touch screen interface) to cause the desired airspace to be visually distinguished; e.g. from a dashed line to a solid line, from a first color to a second color, from a thin line to a thick line, etc. and display the associated airspace data in data box 210. Altering the appearance of the perimeter 211 with respect to other airspaces (e.g. making perimeter 211 a solid line) assures the pilot that the correct airspace was selected. The controller (112, FIG. 1) may also be enabled to automatically select and display the airspace data upon entrance in the airspace, thus reducing the pilot's workload.

The airspace box 210 may graphically display the name of the selected airspace (e.g. NEW CENTURY AIRCENTER) 212, the class of airspace (e.g. Class D) 214, the altitude range of the airspace (e.g. 3600 MSL/GND) 216, and the maximum speed allowed in the airspace (e.g. 200 Kts) 218. The altitude range of the airspace denotes the minimum and maximum altitude of the particular airspace. For example, data box 210 in FIG. 2 indicates that the selected airspace begins at ground level (GND) and extends vertically to an altitude of 3,600 feet over mean sea level (MSL). The maximum speed allowed in the airspace is displayed in knots. It should be appreciated that the airspace box 210 may also contain data associated with additional functions or interactions with the airspace that are not described in connection to FIG. 2. Furthermore, the measurement units for altitude range, maximum speed, etc. may be altered to meet design requirements or pilot preferences.

Located below the navigational map 200 is a vertical situation display (VSD) 220 further illustrating the airspace being entered or the airspace that is selected by the user. It is to be noted that the selected airspace NEW CENTURY AIRCENTER is displayed in the VSD 220 in a manner consistent with how the airspace is displayed in the map display 200; i.e. both are solid. By distinguishing this airspace from the other airspaces that are displayed on the map, this illustrates that this airspace has be selected by the user. The importance of this will be described in greater detail in connection with FIG. 4.

Figure 3:
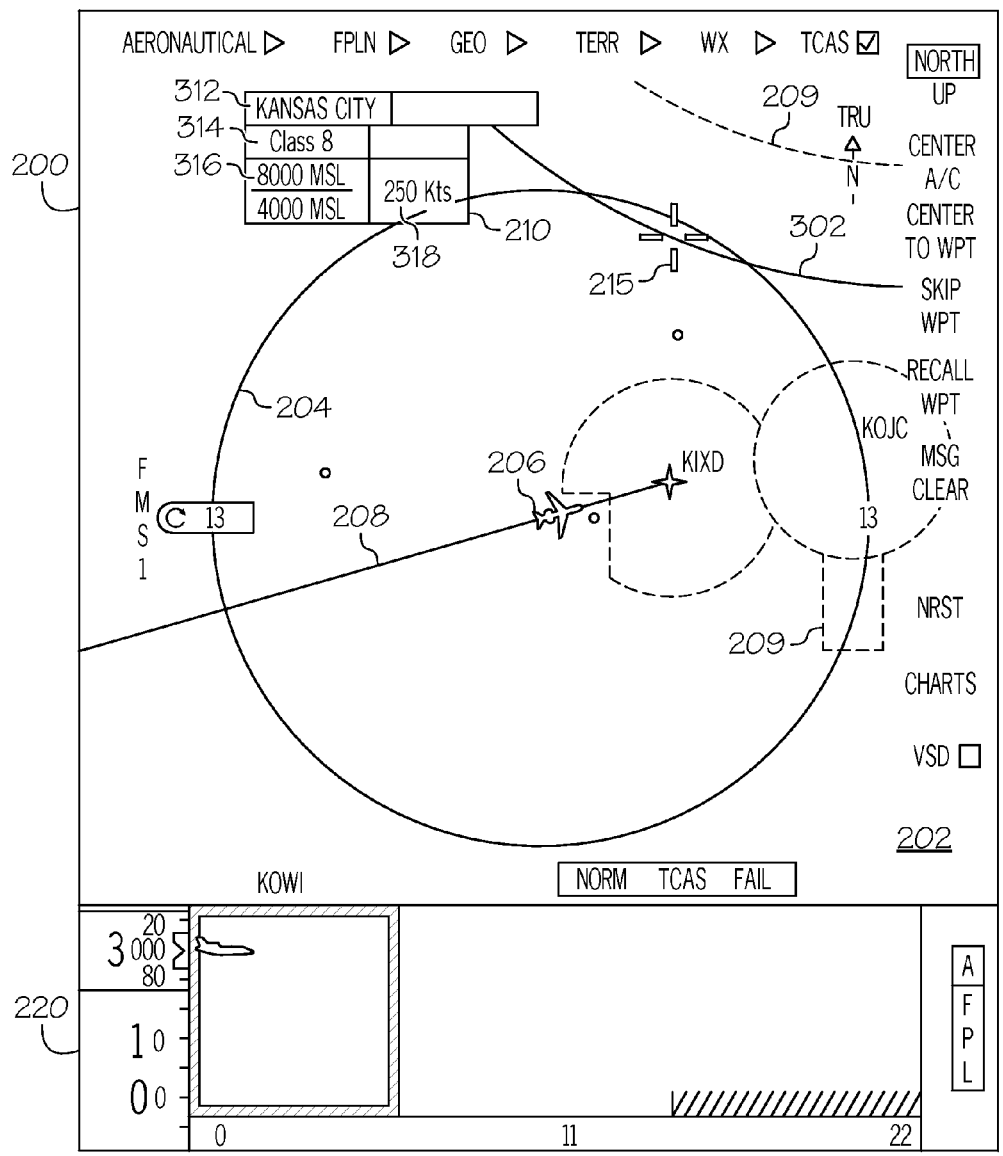

Referring now to FIG. 3, when the pilot has selected a different airspace (e.g. 302), data box 210 displays the name of the selected airspace (i.e. KANSAS CITY) 312, the class of airspace (i.e. Class B) 314, the vertical range of the airspace (i.e. 8000 MSL/4000 MSL) 316, and the maximum speed allowed in the airspace (i.e. 250 Kts) 318. It should also be noted that the boundary of airspace 302 is now solid, (or, for example, highlighted in some manner; e.g. color, thickness, etc.) while the other airspaces are delineated with dashed lines.

Figure 4:
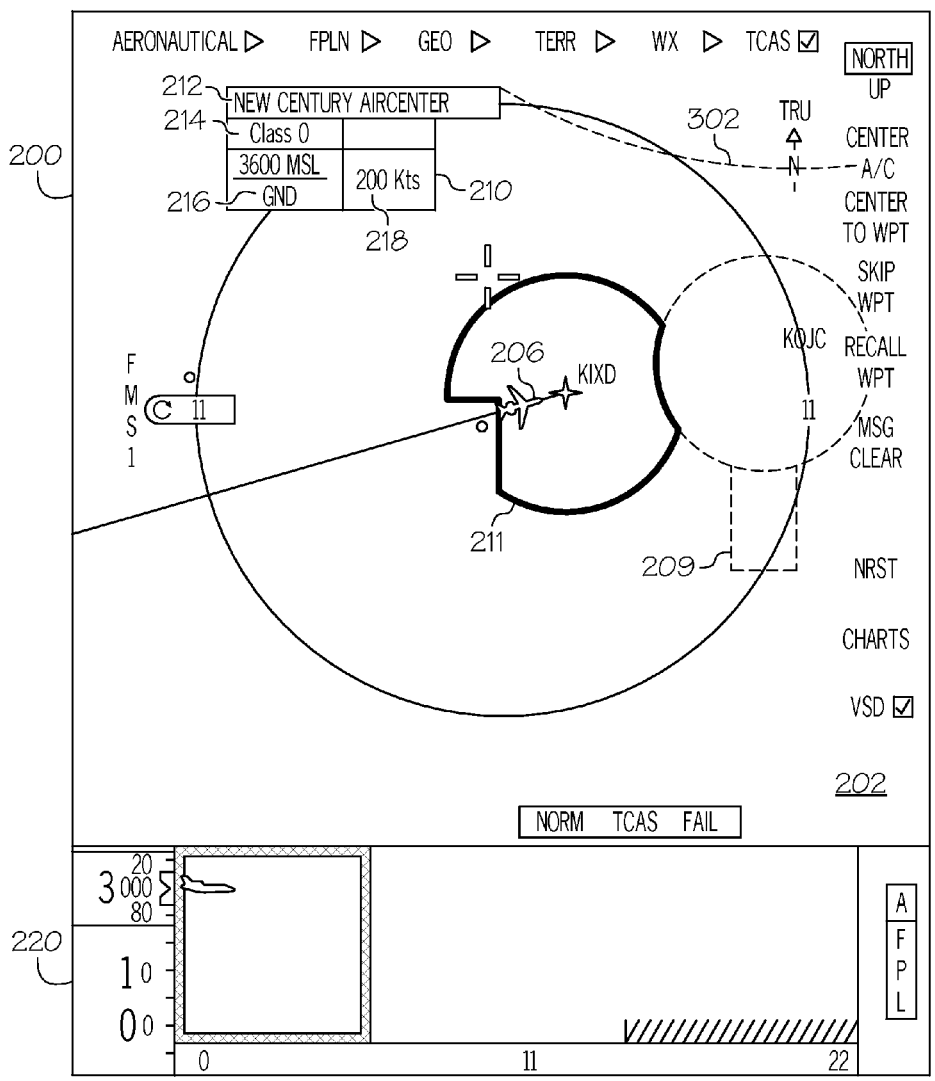
FIG. 4 is a graphical representation of a navigational map and airspace overlay illustrating the generation of a speed warning in accordance with an exemplary embodiment.

FIG. 4 is a graphical representation of a navigational map 200 and airspace overlay 202 illustrating the generation of a speed warning in accordance with in accordance with an embodiment. Controller 112 and graphics module 114 (FIG. 1) rendered a navigational map 200 and airspace overlay 202 on display 103 (FIG. 1) as was the case previously. Airspace box 210 displays the data (e.g. class of airspace, maximum speed within the airspace, etc.) associated with the NEW CENTURY AIRCENTER 212 airspace.

Navigational map 200 shows that the aircraft 206 has entered an airspace; more specifically airspace 211. VSD 220 graphically represents that aircraft 206 has an altitude of approximately three thousand feet, which is between the ground and the maximum height of the NEW CENTURY AIRCENTER airspace 212. However, unlike the situation shown in FIG. 2, the aircraft has exceeded the maximum airspeed permitted in airspace 211. The crew is notified of this through an aural alert generated by the annunciator 105 (FIG. 1). This is also visually represented on the display 103 (FIG. 1) by the perimeter symbology around the airspace 211 on the navigational map 200; e.g. to a third form of symbology such as a different color, a thicker line, or in any manner that alerts the crew of the excessive speed of the aircraft in airspace 211. In FIG. 4, for example, the perimeter of airspace 211 is highlighted with a thick line.

Figure 5:
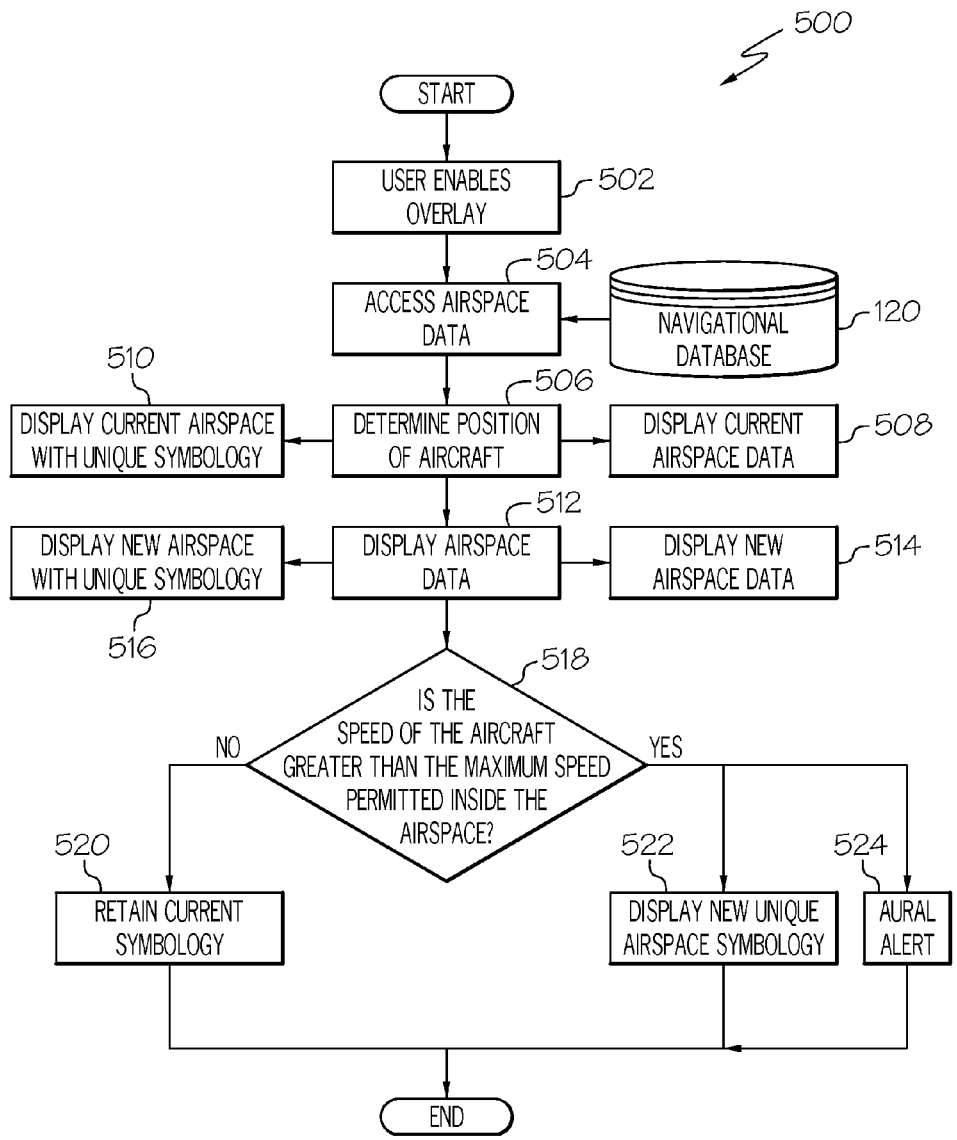
FIG. 5 is a flowchart for graphically displaying airspace symbology in accordance with an exemplary embodiment.

FIG. 5 is a flowchart 500 for graphically displaying airspace symbology in accordance with an embodiment. In STEP 502, a user enables the airspace overlay, and the airspace data is received (STEP 504) from the navigational database 120 (FIG. 1). In STEP 506, the position of the aircraft is determined with respect to the selected airspace, and the data associated with the airspace is displayed (STEP 508). The perimeter of the airspace is displayed in STEP 510 in manner that distinguishes it from other airspaces; i.e. with unique symbology. The display of the current airspace may occur automatically if the aircraft is within a controlled airspace or is initiated by the pilot.

If a new airspace is selected (STEP 512), the new airspace data is graphically rendered with a perimeter symbology that sets it apart from other airspaces (STEP 516). If its determined that the speed of the aircraft exceeds the permitted speed in the airspace (STEP 518), a visual warning is rendered on the display; e.g. the airspace perimeter is rendered in a unique manner to warn the crew (STEP 522). An aural alert may also be generated in STEP 524. If the permitted airspeed has not been exceeded, the current perimeter symbology remains the same (520).

Thus, there has been provided a novel system and method for graphically displaying airspace data in a readily comprehendible manner. This practical solution displays textual data associated with the selected airspace. In addition, if the aircraft enters an airspace at a rate of speed over the maximum speed for the given airspace, the display is altered and aural notifications are given to alert the pilot the speed of the aircraft is above the maximum speed for the airspace. This will reduce a pilot's workload during flight and provide for better position and situational awareness.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for graphically displaying airspace on an aircraft display, the method comprising:
   retrieving airspace data from a database, the airspace data defining a maximum permitted speed in the airspace;
   displaying a visual representation of the airspace on the aircraft display; and
   altering the format of the visual representation of the airspace displayed on the aircraft display responsive to exceeding the maximum permitted speed in the airspace, where the maximum permitted speed in the airspace is defined by an airspace class associated with the airspace.

2. The method of claim 1 wherein the visual representation of the airspace is a line delineating the airspace.

3. The method of claim 2 wherein altering the format of the visual representation of the airspace comprises changing the color of the line.

4. The method of claim 2 wherein altering the format of the visual representation of the airspace comprises changing the line from a solid line to a broken line.

5. The method of claim 1 further comprising altering the format of the visual representation when the airspace is selected by a user.

6. The method of claim 1 further comprising, generating an aural alert when the aircraft exceeds the maximum permitted speed.

7. The method of claim 1 further comprising displaying airspace data proximate to the visual representation of the airspace on the display.

8. The method of claim 7 wherein the step of displaying aircraft data comprises displaying at least one of maximum permitted speed airspace class, altitude range and name of airspace.

9. A system for graphically displaying airspaces on a display, comprising:
   an avionics display; and
   a processor coupled to the avionics display and configured to (1) retrieve airspace data from a database, the airspace data defining a maximum permitted speed in an airspace; (2) display a visual representation of the airspace on the avionics display; and (3) alter the format of the visual representation of the airspace responsive to exceeding the maximum permitted speed in the airspace, where the maximum permitted speed in the airspace is defined by an airspace class associated with the airspace.

10. The system of claim 9 wherein the visual representation of the airspace comprises a line enclosing the airspace, and wherein the processor is configured to alter the format of the visual representation of the airspace by altering a format of the line as displayed on the avionics display.

11. The system of claim 9 wherein the processor is further configured to display aircraft data proximate the visual representation of the airspace on the display.

12. The system of claim 9 wherein the processor is configured to alter the format of the visual representation of the airspace by changing a color of the visual representation of the airspace as displayed on the avionics display.

13. A method for graphically displaying airspace on an aircraft cockpit display, the method comprising:
 retrieving aircraft data from a database;
 displaying the aircraft data on the display;
 displaying a visual representation of the airspace; and
 altering the visual representation to a third visual representation, if the aircraft exceeds a permitted maximum speed in the airspace, where the maximum permitted speed in the airspace is defined by an airspace class associated with the airspace.

14. The method of claim 13 wherein altering the visual representation comprises changing the appearance of a line delineating the airspace.

15. The method of claim 14 wherein changing the appearance of the line delineating the airspace comprises changing a color of the line delineating the airspace.

16. The method of claim 15 further comprising displaying airspace data proximate to the airspace.

17. The method of claim 16 wherein displaying aircraft data comprises displaying at least one of maximum permitted speed airspace class, altitude range and name of airspace.

* * * * *